United States Patent [19]
Kuhm et al.

[11] Patent Number: 5,645,811
[45] Date of Patent: Jul. 8, 1997

[54] PROCESS FOR THE PRODUCTION OF VERY FINE-PARTICLE ZEOLITIC ALKALI METAL ALUMINUM SILICATES

[75] Inventors: Peter Kuhm, Hilden; Rainer Salz; Gerhard Blasey, both of Duesseldorf, all of Germany

[73] Assignee: Henkel Kommanditgesellschaft auf Aktien, Duesseldorf, Germany

[21] Appl. No.: 525,699

[22] PCT Filed: Mar. 16, 1994

[86] PCT No.: PCT/EP94/00836

§ 371 Date: Sep. 22, 1995

§ 102(e) Date: Sep. 22, 1995

[87] PCT Pub. No.: WO94/21558

PCT Pub. Date: Sep. 29, 1994

[30] Foreign Application Priority Data

Mar. 25, 1993 [DE] Germany .................. 43 09 656.5

[51] Int. Cl.$^6$ ..................... C01B 39/16; C01B 39/20
[52] U.S. Cl. ................. 423/700; 423/711; 423/DIG. 21; 423/DIG. 24
[58] Field of Search ................... 423/700, 711, 423/DIG. 21, DIG. 24

[56] References Cited

U.S. PATENT DOCUMENTS

| | | | |
|---|---|---|---|
| 3,433,589 | 3/1969 | Ciric et al. | 423/700 |
| 3,516,786 | 6/1970 | Maher et al. | 423/710 |
| 4,073,867 | 2/1978 | Roebke et al. | 423/DIG. 24 |
| 4,102,977 | 7/1978 | Sugahara et al. | 423/DIG. 24 |
| 4,303,626 | 12/1981 | Bert | 423/711 |
| 4,303,627 | 12/1981 | Bert | 423/710 |
| 4,303,628 | 12/1981 | Bert | 423/710 |
| 4,303,629 | 12/1981 | Bert | 423/711 |
| 4,305,916 | 12/1981 | Bert | 423/710 |
| 4,339,417 | 7/1982 | Strack | 423/710 |
| 4,339,418 | 7/1982 | Strack | 423/711 |
| 4,339,419 | 7/1982 | Strack | 423/710 |
| 4,339,420 | 7/1982 | Strack | 423/710 |
| 4,376,106 | 3/1983 | Miyanohora et al. | 423/DIG. 21 |
| 4,416,805 | 11/1983 | Kostinko | 502/67 |
| 4,534,947 | 8/1985 | Vaughan | 423/DIG. 24 |
| 4,587,115 | 5/1986 | Arika et al. | 423/700 |
| 5,474,753 | 12/1995 | Bretaudeau et al. | 423/700 |

FOREIGN PATENT DOCUMENTS

| | | |
|---|---|---|
| 0034693 | 9/1981 | European Pat. Off. . |
| 0034694 | 9/1981 | European Pat. Off. . |
| 0034695 | 9/1981 | European Pat. Off. . |
| 0034696 | 9/1981 | European Pat. Off. . |
| 384070 | 8/1990 | European Pat. Off. . |
| 0485262 | 5/1992 | European Pat. Off. . |
| 2370688 | 6/1978 | France . |
| 2370689 | 6/1978 | France . |
| 2370690 | 6/1978 | France . |
| 2370691 | 6/1978 | France . |
| 2370692 | 6/1978 | France . |
| 2370693 | 6/1978 | France . |
| 2704310 | 8/1977 | Germany . |
| 2651419 | 5/1978 | Germany . |
| 2651420 | 5/1978 | Germany . |
| 2651436 | 5/1978 | Germany . |
| 2651437 | 5/1978 | Germany . |
| 2651445 | 5/1978 | Germany . |
| 2651485 | 5/1978 | Germany . |
| 2734296 | 2/1979 | Germany . |
| 2951192 | 7/1980 | Germany . |
| 2941636 | 5/1981 | Germany . |
| 3007044 | 9/1981 | Germany . |
| 3007080 | 9/1981 | Germany . |
| 3007087 | 9/1981 | Germany . |
| 3007123 | 9/1981 | Germany . |
| 3011834 | 10/1981 | Germany . |

OTHER PUBLICATIONS

H. Wachernig, Sprechsaal, vol. 121, No. 3, 1988, pp. 213 to 215 (no month).

*Primary Examiner*—Karl Group
*Assistant Examiner*—David Sample
*Attorney, Agent, or Firm*—Ernest G. Szoke; Wayne C. Jaeschke; Henry E. Millson, Jr.

[57] ABSTRACT

Finely ground zeolithic alkali metal aluminum silicates having the general formula: $xMe_2O.Al_2O_3.ySiO_2.zH_2O$, are prepared by mixing both reaction components, alkali metal silicate and alkali metal aluminate, in the presence of a stoichiometrically excessive amount of alkali metal hydroxide. The thus obtained gel is matured, the reaction mixture is heated up to crystallisation temperature, then crystallised. During crystallisation, at least one of both reaction components is added to the reaction mixture.

18 Claims, No Drawings

PROCESS FOR THE PRODUCTION OF VERY FINE-PARTICLE ZEOLITIC ALKALI METAL ALUMINUM SILICATES

BACKGROUND OF THE INVENTION

1. Field of the Invention

This invention relates to a process for the production of very fine-particle alkali metal aluminium silicates, more particularly zeolites of the A type, of the P type and of the faujasite type (X and Y).

2. Statement of Related Art

Alkali metal aluminium silicates of the type in question are used, for example, as builders for laundry detergents, dishwashing detergents and cleaning formulations, as molecular sieves, catalysts and absorbents and as additives in ceramic frits and glazes.

Two important criteria for the use of zeolites in laundry detergents, dishwashing detergents and cleaning compositions and as additives in ceramic frits and glazes are the mean particle size (expressed as the $d_{50}$ value) and the width of the particle size distribution spectrum. The $d_{50}$ value indicates that 50% by weight of the measured sample consists of particles which are smaller than the indicated value. There are various methods for measuring the $d_{50}$ value. The measured values obtained by the various methods cannot readily be compared with one another. In the context of the present invention, the $d_{50}$ value is measured by light diffraction and light scattering methods. This procedure is described, for example, in H. Wachernig, Sprechsaal, Vol. 121, No. 3, 1988, pages 213 to 215.

Another important criterion for the use of zeolites in laundry detergents, dishwashing detergents and cleaning compositions is their cation exchange capacity, more particularly their exchange capacity with respect to calcium ions. The corresponding values were determined by adding the corresponding zeolite to a calcium chloride solution and, after filtration, subjecting the remaining calcium ions present in the solution to complexometric titration.

There are various known processes for the production of very fine-particle zeolites of the zeolite A type.

DE-A-29 51 192 describes a process for the production of zeolite A with a small and uniform particle size. The particle size is controlled on the basis of the following parameters:

1) the stoichiometric $SiO_2/Al_2O_3$ ratio,
2) the stoichiometric $H_2O/Na_2O$ ratio,
3) the crystallization time of the amorphous alumosilicate gel at a given temperature,
4) the stoichiometric $Na_2O/Al_2O_3$ ratio and
5) the concentration of $Al_2O_3$.

The particle size of the zeolite formed after crystallization is reduced by increasing the solids concentration on the one hand and by increasing the $Na_2O/Al_2O_3$ ratio in the reaction mixture on the other hand, i.e. in the solutions which, after they have been combined, form an amorphous alumosilicate gel. This process has its natural limits: if, for example, the solids concentration is excessively increased, the particle size spectrum expands. If the $Na_2O/Al_2O_3$ ratio is too high, the time between complete reaction to zeolite 4A and the following conversion into hydroxysodalite is very short so that there is not enough time for subsequent processing of the zeolite suspension.

It is known from DE-A-27 04 310 that, after the reaction components involved in the production of alkali metal aluminium silicates have been mixed with intensive stirring, the intensive stirring can be continued at least until the viscosity maximum is exceeded or, optionally, the viscosity maximum is not fully reached, after which the suspensions are recycled at least once through a size-reducing unit and are then optionally kept at elevated temperature pending crystallization.

It is known from DE-A-27 34 296 that, in the production of fine-particle sodium aluminium silicates, the suspension obtained after the aqueous sodium aluminate solution has been rapidly mixed with the aqueous sodium silicate solution can be briefly stirred at the same temperature before the crystallization step is carried out at elevated temperature.

DE-A-30 11 834 describes a process for the production of very fine-particle zeolitic sodium aluminium silicates, in which steam is introduced during discontinuous crystallization and, at the same time, the suspension is stirred with multiple-stage high-shear stirrers.

DE-A-29 41 636 also relates to a process for the continuous production of very fine-particle zeolitic sodium aluminium silicates, in which suspensions of the X-ray amorphous sodium aluminium silicate flow continuously through an at least 20-stage crystallization reactor acting and/or constructed in stages, the suspensions being kept at a temperature of 80° to 100° C. in the reactor until the degree of crystallization of the zeolitic sodium aluminium silicate has reached at least 80% of the theoretically obtainable crystallinity.

DE-A-26 51 419, 26 51 420, 26 51 436, 26 51 437, 26 51 445 and 26 51 485 describe processes for the production of fine-particle crystalline zeolite powders of the zeolite A type, in which precipitation of the sodium aluminium silicate gel initially formed is delayed by mixing the reaction components in steps over a relatively long period. The gel obtained is then crystallized at a temperature which is higher than the precipitation temperature. These processes give comparatively low volume/time yields.

DE-A-30 07 044, 30 07 080, 30 07 087 and 30 07 123 describe similar processes in which the reaction components are also mixed together in several steps with forming or ageing intervals in between. In these cases, too, crystallization takes place subsequently at a higher temperature. The crystalline zeolites obtained have mean particle sizes of up to 9 μm (cf. Comparison Example 9 below).

Processes for the production of particularly fine-particle products are also known for zeolites of the faujasite type.

U.S. Pat. No. 3,516,786 describes a process in which particularly small particles are obtained by additions of 0.1 to 20% of an organic solvent, such as methanol or dimethyl sulfoxide, to an alumosilicate gel before the crystallization step. On account of the toxicity of the solvents mentioned, special precautions have to be taken in the working-up of the process liquors.

There are several structurally different variants of zeolite P, differing from one another above all in the symmetry of the crystal lattice. P zeolites of the $P_c$ type (also described as P1, B1, cubic form) and of the $P_t$ type (also described as P2, tetragonal form) and mixed crystals thereof or mixtures of both forms are preferably used for applications in laundry detergents, dishwashing detergents and cleaning compositions. The Si:Al ratio is between 1.3:1 and 0.9:1 for a calcium binding capacity of 130 to 165 mg CaO per g of water-free alumosilicate.

DESCRIPTION OF THE INVENTION

The problem addressed by the present invention was to provide a process for the production of very fine-particle zeolitic alkali metal aluminium silicates, more particularly zeolites of the A type, the P type and the faujasite type (zeolites X and Y), which would produce the zeolites mentioned in particularly fine-particle form with a particularly narrow particle size distribution and a particularly high calcium binding capacity and which would provide for a high volume/time yield.

Accordingly, the present invention relates to a process for the production of very fine-particle zeolitic alkali metal aluminium silicates corresponding to general formula (I):

$$xMe_2O \cdot Al_2O_3 \cdot y_{SiO_2} \cdot zH_2O \qquad (I)$$

in which

Me is sodium and/or potassium, x is a number of 0.8 to 1.3, y is a number of 1.3 to 10 and z is a number of 0 to 6, by mixing of the reaction components, alkali metal silicate dissolved in water and alkali metal aluminate dissolved in water, in the presence of more than the stoichiometric quantity of alkali metal hydroxide dissolved in water, subsequent ageing of the gel obtained and crystallization, characterized in that (a) the reaction components are mixed together with intensive stirring over a period of less than 10 minutes at a temperature in the range from 20° to 70° C., at least one of the two reaction components being used in less than the stoichiometrically necessary quantity or both reaction components being used in the stoichiometrically necessary quantity, (b) the reaction mixture is stirred for 5 to 40 minutes at the temperature established in step (a), (c) after the ageing step (b), the reaction mixture is heated with stirring for 5 to 30 minutes to a temperature of more than 70° C. to the boiling point of the reaction mixture, (d) the amorphous alkali metal aluminium silicate gel obtained is allowed to crystallize for at least 10 minutes at the temperature established in step (c), (e) 2 to 50 mole-% of at least one of the two reaction components, based on the quantity of the reaction components already used in step (a), being added to the reaction mixture during the crystallization step (d) either to make up the balance to the stoichiometrically necessary quantity or as a stoichiometric excess.

General formula (I) above covers a plurality of substances which, although often differing only slightly in their chemical composition, differ considerably in their structure and their properties. In addition to the chemical composition, X-ray diffractograms are used to identify such zeolites in the case of crystalline types. Zeolites of the A type, the P type and the faujasite type are of particular interest in this regard.

A preferred embodiment of the present invention relates to the production of the special zeolites mentioned above. These zeolites are characterized in that, in general formula (I), y is a number in the range from 1.35 to 2.35 for zeolites of the A type, in the range from 1.85 to 3 for zeolites of the P type and in the range from 2.5 to 10 for zeolites of the faujasite type.

It is possible by the process according to the invention to produce zeolitic alkali metal aluminium silicates, more particularly the special zeolites mentioned above, in particularly fine-particle form and with a particularly narrow particle size distribution spectrum. Accordingly, another preferred embodiment of the process according to the invention is characterized in that the mean particle size, expressed as the $d_{50}$ value, of the crystalline zeolites obtained is smaller than 4 μm for zeolites of the A type, smaller than 2 μm for zeolites of the P type and smaller than 6 μm for zeolites of the faujasite type.

In addition, the zeolites produced by the process according to the invention are distinguished by a very high cation exchange capacity—corresponding to a high calcium binding capacity.

Another advantageous effect of the process according to the invention is that the mother liquors remaining after removal of the crystalline zeolites formed have a very low content of $SiO_2$ or $Al_2O_3$, depending on the control of the process. This is a particular advantage when the mother liquors are to be used either for the production of aluminate liquor as educt for the synthesis of zeolites or for the production of waterglass solutions (hydrothermal synthesis) as educt for the synthesis of zeolites by the recycle process. This is because the $SiO_2$ or $Al_2O_3$ present in the mother liquor would otherwise react either with the aluminate formed or with the silicate formed to form hydroxysodalite for which no economic use has hitherto been found.

According to general formula (I) above, the alkali metal cation in the zeolitic alkali metal aluminium silicates to be produced in accordance with the invention consists of sodium or potassium (these two cations may even be present in the form of a mixture). Although only sodium is mentioned as alkali metal cation both in the foregoing disclosure and in the following Examples, the corresponding observations apply equally to potassium as alkali metal cation. In both cases, a good cation exchange capacity, particularly with respect to calcium cations, is guaranteed. According to the invention, however, sodium is the preferred alkali metal cation—mainly for reasons of cost. If both alkali metal cations are present in the form of a mixture, it is preferred in accordance with the invention for the sodium cation to be present in excess, i.e. more than 50 mole-%, in the zeolites formed. Accordingly, another preferred embodiment of the process according to the invention is characterized in that the alkali metal cation of the alkali metal silicate and/or the alkali metal aluminate which are used as reaction components is selected from sodium and potassium, with the proviso that at least 50 mole-% of the alkali metal cations in the zeolitic alkali metal aluminium silicate are sodium cations.

Among the key features of the process according to the invention, particular emphasis is placed on the feature described under (e) above, according to which at least one of the two reaction components—alkali metal silicate and alkali metal aluminate—is added to the reaction mixture during the crystallization step. In addition to the other key features, this "replenishment" during the crystallization step has a critical influence on the positive effects obtainable with the process according to the invention which are reflected in particular in the only small mean particle size of the crystalline zeolites obtained. It is of no importance to the process according to the invention whether—during mixing of the reaction components with one another in step (a)—one of the two reaction components is used in less than the stoichiometric quantity and the balance of this reaction component, based on the stoichiometrically necessary quantity, is only added during the crystallization step or whether—in the precipitation step (a)—the two reaction components are used in the stoichiometrically necessary quantity and at least one of the reaction components is replenished in a stoichiometric excess during the crystallization step.

As already mentioned, the combination of features (a) to (e) as listed above is crucially important to the process according to the invention. Accordingly, the features crucial to the invention are discussed individually in the following:

Step (a) of the process comprises mixing the reaction components. It may also be called the "precipitation step" because the amorphous alkali metal aluminium silicate gel initially formed precipitates in this process step. Two parameters are crucially important to the invention in this regard, namely the duration of the precipitation step or the duration of the mixing of the reaction components and the temperature of the aqueous solutions of the reaction components or of the reaction mixture formed. The reaction components should be mixed quickly, i.e. in less than 10 minutes. In a preferred embodiment of the invention, the reaction components are mixed for less than 5 minutes. There is little point in mentioning a lower limit to the mixing time because it is primarily dependent on the quantity of reaction components to be mixed. According to the invention, the temperature of the reaction components or of the reaction mixture formed should be in the range from 20° to 70° C. In a preferred embodiment of the invention, the temperature in question is in the range from 40° to 65° C., this temperature range applying in particular to the production of zeolite of the A type. In general, the mixing temperature should be adapted to the particular type of zeolite required. Thus, the precipitation temperature in step (a) may be 20° C., for example, for the production of zeolite of the faujasite type and 70° C., for example, for the production of zeolite of the P type.

The quantity of reaction components to be used in the precipitation step (a), i.e. the stoichiometric ratio of the components, is determined primarily by the type of zeolite which is to be produced in the process according to the invention. In other words, the particular stoichiometric ratio of the components may readily be calculated by the expert from general formula (I) above for the particular type of zeolite. The following stoichiometric ratios of the components are mentioned by way of example for the zeolites preferably produced by the process according to the invention:

| Zeolite A: | 4.2 $Na_2O:Al_2O_3$:2 | $SiO_2$:100 $H_2O$ |
|---|---|---|
| Faujasite (zeolite X): | 4.56 $Na_2O:Al_2O_3$:3 | $SiO_2$:223 $H_2O$ |
| Zeolite P: | 4.32 $Na_2O:Al_2O_3$:2.3 | $SiO_2$:182 $H_2O$ |

According to the invention, the two reaction components—alkali metal silicate dissolved in water and alkali metal aluminate dissolved in water—should be mixed together in the presence of more than the stoichiometrically necessary quantity of alkali metal hydroxide dissolved in water. The stoichiometric ratios mentioned above with regard to the zeolites preferably produced by the process according to the invention include this excess of alkali metal hydroxide (here in the form of $Na_2O$). In general, this alkali excess—based on $Na_2O$—should amount to 4 to 5 moles of $Na_2O$ to 1 mole of $Al_2O_3$ or 2 moles of $SiO_2$.

As mentioned above, it is of no importance to the process according to the invention whether one of the two reaction components is used in less than the stoichiometrically necessary quantity or whether both reaction components are used in the stoichiometrically necessary quantity, the replenishment of the particular reaction components during the crystallization step naturally having to be taken into consideration in this regard. In principle, both the aluminate and the silicate component—together with the aqueous alkali metal hydroxide solution—may be initially introduced during mixing of the reaction components in step (a) and the other component subsequently added. In a preferred embodiment of the invention, however, alkali metal silicate is initially ly introduced in the stoichiometrically necessary quantity during mixing of the reaction components in step (a) and alkali metal aluminate is added either in less than the stoichiometrically necessary quantity or in the stoichiometrically necessary quantity, alkali metal aluminate being replenished in step (d), i.e. the crystallization step. This procedure is advantageous in the interests of a narrow particle size distribution of the zeolite crystals obtained and a small mean particle size thereof.

Mixing of the reaction components should be accompanied by "intensive stirring" of the aqueous solutions to ensure thorough mixing thereof. Accordingly, the expression "intensive stirring" is to be interpreted to mean that thorough and complete mixing of the aqueous solutions is obtained in the precipitation step (a).

Step (b) may be defined as "forming" or "ageing", based on the amorphous gel initially formed in the precipitation step (a). Two parameters are crucial in this regard, namely the duration of the ageing step and the temperature of the reaction mixture. According to the invention, the duration of the ageing step should be between 5 and 40 minutes and is preferably between 10 and 30 minutes. During the ageing step, the reaction mixture is kept at the temperature selected for the precipitation step (a). If the forming time is too short, the zeolites obtained can have an overly large mean particle size. On the other hand, an excessively long forming time is undesirable with regard to the high volume/time yield required in accordance with the invention. The reaction mixture should also be stirred during step (b).

After the ageing step (b), the reaction mixture is heated with stirring from the temperature selected for step (b) to the required crystallization temperature over a period of 5 to 30 minutes and preferably over a period of 5 to 20 minutes. According to the invention, the crystallization temperature is in the range from >70° C. to the boiling point of the particular reaction mixture, crystallization temperatures of 80° to 100° C. and preferably in the range from 80° to 90° C. being preferred in dependence upon the particular type of zeolite required. The heating time in step (c) is also dependent upon the particular type of zeolite required. For the production of zeolite A, for example, the heating time can be relatively short, for example 5 minutes, whereas for zeolites of the faujasite type a longer heating time, for example 20 minutes, is of advantage.

When the crystallization temperature is reached, the amorphous alkali metal aluminium silicate gel initially formed begins to crystallize in crystallization step (d). The duration of this crystallization step should be no less than 10 minutes. By contrast, the maximum duration of the crystallization step is dependent upon the particular type of zeolite required. The following approximate values, for example, may be mentioned for the individual zeolite types: zeolite A: at most 8 hours, zeolites of the faujasite type: at most 2 days, zeolite P: at most 3 days. In general, the crystallization step is advantageously interrupted at the moment when the zeolite required has reached its maximum calcium binding capacity. Determination of the calcium binding capacity is discussed in detail hereinafter. The particular type of zeolite required also determines whether or not the reaction mixture is stirred during the crystallization step. In the production of zeolites of the A type and the P type, stirring during the crystallization step is generally of advantage whereas, in the production of zeolites of the faujasite type, the reaction mixture is preferably not stirred during the crystallization step.

Step (e) of the process according to the invention comprises the "replenishment" of one of the two reaction components during the crystallization step. According to the invention, 2 to 50 mole-% and preferably 5 to 30 mole-% of at least one of the two reaction components, based on the quantity of the reaction components already used in the precipitation step (a), is added to the reaction mixture during the crystallization step. Depending on the quantity of the particular reaction components used in the precipitation step (e), the function of this replenishment is either to provide the balance to the stoichiometrically necessary quantity where the particular reaction component has been used in less than the stoichiometric quantity in step (a). On the other hand, however, replenishment may also serve to establish a stoichiometric excess where the reaction components have already been mixed together in the stoichiometrically necessary quantity in the precipitation step (a). According to the invention, both the silicate component and the aluminate component may be added to the reaction mixture during crystallization in step (d). In addition, it is also possible in principle to replenish both reaction components in step (e), in which case the quantities mentioned above in mole-% should again be taken into consideration. In a preferred embodiment of the invention, the silicate component is initially introduced in the stoichiometrically necessary quantity in the precipitation step (a), as mentioned above, while the aluminate component is added in step (e) either to provide the balance to the stoichiometrically necessary quantity or as a stoichiometric excess. Replenishment of the aluminate components leads to very small mean particle sizes, particularly in the production of zeolites of the A type. Accordingly, another preferred embodiment of the process according to the invention is characterized in that the crystalline zeolites of the type A obtained have a mean particle size, expressed as the $d_{50}$ value, of less than 3 μm.

The time at which one of the two reaction components is replenished during the crystallization step may generally extend to the entire duration of the crystallization step, replenishment advantageously not being commenced immediately after the beginning of the crystallization step. According to the invention, the optimum replenishment time is in the range from 25 to 75% of the total necessary crystallization time which is also dependent upon the particular type of zeolite required.

In principle, the process according to the invention may be carried out both discontinuously and continuously using the reactors already described in detail in the prior art for the production of zeolite, for example open or closed reaction vessels, cascades of stirred tank reactors, stirred columns or tube reactors.

The zeolites produced by the process according to the invention may be used, for example, as molecular sieves, catalysts, absorbents or as additives in ceramic frits and glazes. By virtue of their particularly small mean particle sizes and their very high cation exchange capacity, the zeolites obtained, more particularly zeolites of the A type, are used as builders for laundry detergents, dishwashing detergents and cleaning compositions.

Determination of the characteristic data

The zeolite samples produced by the process according to the invention were characterized by the following analytical investigations:
1) Determination of the composition of the "mother liquor"
2) Ignition loss of the dried zeolite powders
3) Calcium binding capacity (CaBC)
4) Particle size distribution (PSD)
5) X-ray diffraction analysis (XDA)

Ad 1:
On completion of crystallization, the filtrate remaining after removal of the zeolite from the reaction mixture is collected and titrated using a Titro-Processor 636 (Metrohm). The percentage residual content of $Al_2O_3$, NaOH and $SiO_2$ in the solution is determined in this way.

Ad 2:
Approximately 0.5 g of the zeolite sample dried at 110° C are weighed into porcelain crucibles—calcined beforehand to constant weight—on an analytical balance and calcined for 1 h at 800° C. in a muffle furnace. The weight loss is an indication of the content of active substance (AS) (=% by weight ignition residue) in the particular sample.

Ad 3:
The sample dried at 110° C. in a recirculating air drying cabinet is weighed in—based on the measured ignition loss—in such a way that the sample weight corresponds to 200 mg of active substance. 200 ml of a $CaCl_2$ solution corresponding to 30°d are added to the sample, followed by stirring for 10 minutes at room temperature at a speed of 400 r.p.m. Immediately afterwards the samples are filtered clear through a glass filter nutsch additionally provided with a glassfiber filter.

A Merck indicator buffer tablet for determining water hardness and 5 ml of an approximately 35% by weight ammonia solution are added to 100 ml of the filtrate. Using an N/28 Komplexon® solution (1 ml =1 g CaO), titration is then carried out until the color changes from red to green. The content of the $CaCl_2$ solution used (30°d) is determined beforehand by the same titration (without addition of the test substance) and corresponds to the "blank value" (BV).

$$\text{Calculation:} \frac{(BV - \text{Consumption}) \times 2}{\text{Sample weight in } g\, AS} = \text{mg CaO/g } As$$

Ad 4:
The particle size distribution (PSD) was determined with a Sympatec Helos® and provides an indication of the size of the crystals formed. A moist sample of the zeolite filter cake, washed out (pH 10), and a dry sample (drying of the solid in a recirculating air drying cabinet at 110° C.) were measured. The PSD is expressed in μm.

The "$d_{50}$" value shown means that 50% by weight of the measured particles have a smaller diameter than the value in μm mentioned. The same applies to "$d_{80}$", "$d_{90}$" and "$d_{100}$" values. By "$d_{max}$" is meant the particle size for which no more particles can be detected, i.e. all the particles are smaller than the value indicated.

"%>10.5 μm" means for example a corresponding percentage of sample material with a particle size of more than 10.5 μm.

Ad 5:
The X-ray diffraction analysis (XDA) was carried out with a Siemens D 500 diffractometer and is a measure of the crystallinity of the synthesized products.

EXAMPLES

The following aqueous solutions were used as reaction components for the Examples:

An aqueous sodium silicate solution containing 26.9% by weight of $SiO_2$ and 8% by weight of $Na_2O$, total solids 34.9% by weight, molar ratio $SiO_2:Na_2O$=3.46:1 (soda waterglass 37/40, a product of Henkel KGaA).

An aqueous sodium aluminate solution containing 11.35% by weight of $Al_2O_3$ and 13.5% by weight of $Na_2O$.

A 25% by weight aqueous sodium hydroxide solution.

The quantities used are calculated from the stoichiometric ratios of the components indicated in the individual Examples and the accompanying explanatory data.

Example 1

Production of zeolite NaA, silicate replenishment

Stoichiometric ratio of the components: 4.2 $Na_2O:Al_2O_3:2SiO_2:100\ H_2O$

The aqueous sodium silicate solution and the aqueous sodium hydroxide solution were initially introduced. The sodium aluminate solution was added to these two solutions with stirring. The sodium aluminium silicate gel precipitated was then stirred (=ageing, ripening) at the temperature of the precipitation step (=mixing), subsequently heated to the crystallization temperature and crystallized at that temperature.

Test (1a)—cf. the Tables—is intended for comparison, the entire stoichiometrically necessary quantity of sodium silicate being initially introduced. In all the other tests (1b) to (1g), the sodium silicate solution was initially introduced in less than the stoichiometrically necessary quantity, based on the total stoichimetrically necessary quantity of silicate, the balance only being added during the crystallization step.

In all the tests, the following parameters were kept constant:

addition time of the aluminate solution: 2 minutes (=mixing time), precipitation temperature: 60° C. (=temperature during mixing), forming time: 10 minutes, heating time to the crystallization temperature; 5 minutes, crystallization temperature: 85° C., crystallization time: 60 minutes, with stirring.

Table I shows the particular quantity of silicate in percent added during the crystallization step, based on 100% of the total stoichiometrically necessary quantity, and the replenishment time, based on the time at which the crystallization temperature was reached.

Table II shows the characteristic data of the zeolites of the NaA type resulting from these batches. A reduction in the mean particle size of the zeolites—attributable to the replenishment of silicate—is clearly apparent.

Table III shows the composition of the mother liquors obtained in the tests in regard to the $SiO_2$ and $Al_2O_3$ contents. It can be seen that the $Al_2O_3$ content of the mother liquors falls to less than half that of test (1a).

TABLE I

| Test No. | Quantity of silicate replenished | Addition time |
| --- | --- | --- |
| 1a* | 0% | 0 min. |
| 1b | 5% | 15 mins. |
| 1c | 10% | 5 mins. |
| 1d | 10% | 10 mins. |
| 1e | 10% | 15 mins. |
| 1f | 10% | 20 mins. |
| 1g | 10% | 25 mins. |

*Comparison Example

TABLE II

| Test No. | CaBC | $d_{50}$ [µm] | $d_{max}$ [µm] | Crystallinity |
| --- | --- | --- | --- | --- |
| 1a* | 161 | 4.70 | 32.5 | High, NaA |
| 1b | 161 | 3.93 | 28.6 | High, NaA |
| 1c | 162 | 3.71 | 28.2 | High, NaA |
| 1d | 165 | 3.78 | 26.5 | High, NaA |
| 1e | 164 | 3.96 | 23.5 | High, NaA |
| 1f | 163 | 3.68 | 17.3 | High, NaA |
| 1g | 163 | 3.67 | 23.5 | High, NaA |

*Comparison Example

TABLE III

| Test No. | $SiO_2$ content [% by weight] | $Al_2O_3$ [% by weight] |
| --- | --- | --- |
| 1a* | 0.28 | 0.38 |
| 1b | 0.31 | 0.29 |
| 1c | 0.27 | 0.26 |
| 1d | 0.28 | 0.24 |
| 1e | 0.26 | 0.19 |
| 1f | 0.28 | 0.18 |
| 1g | 0.28 | 0.16 |

*Comparison Example

Example 2

Production of zeolite NaA, silicate replenishment

The tests of this Example show that the principle of silicate replenishment during the crystallization step leads to positive effects even when the stoichiometric ratios differ overall from those of Example 1. In these tests, sodium silicate solution was added in more than the stoichiometrically necessary quantity, based on the total quantity of silicate required according to the stoichiometric ratios of Example 1, during the crystallization step.

In all the tests, precipitation (mixing of the reaction components) took place in accordance with the stoichiometric ratios of Example 1, except that the total quantity of silicate required was used during the precipitation step. Sodium silicate solution was added in more than the stoichiometrically necessary quantity, based on the total stoichiometrically necessary quantity of silicate, during the crystallization step so that the molar ratio of $Al_2O_3$ to $SiO_2$ was less than 1:2 at the end of the crystallization step.

All other parameters were kept constant as in Example 1.

Table IV shows the excess quantity of silicate added during the crystallization step in percent, based on 100% of the total stoichiometrically necessary quantity, and the addition time after the beginning of crystallization.

The disclosures of Tables V and VI in regard to characteristic data and mother liquors correspond to those of Tables II and III. It can be seen that, even when silicate is replenished in excess, both the mean particle size of the zeolites and the $Al_2O_3$ content of the mother liquors are reduced.

TABLE IV

| Test No. | Silicate excess, replenished | Addition time |
| --- | --- | --- |
| 2a | 5% | 15 mins. |
| 2b | 5% | 25 mins. |
| 2c | 5% | 35 mins. |
| 2d | 10% | 15 mins. |

TABLE V

| Test No. | CaBC | $d_{50}$ [μm] | $d_{max}$ [μm] | Crystallinity |
|---|---|---|---|---|
| 2a | 162 | 3.89 | 17.4 | High, NaA |
| 2b | 161 | 3.34 | 17.4 | High, NaA |
| 2c | 163 | 3.06 | 17.4 | High, NaA |
| 2d | 162 | 3.74 | 17.4 | High, NaA |

TABLE VI

| Test No. | $SiO_2$ content [% by weight] | $Al_2O_3$ [% by weight] |
|---|---|---|
| 2a | 0.38 | 0.17 |
| 2b | 0.42 | 0.14 |
| 2c | 0.42 | 0.17 |
| 2d | 0.19 | 0.10 |

Example 3

Production of Zeolite NaX (faujasite), silicate replenishment

Stoichiometric ratio of the components: 4.56 $Na_2O:Al_2O_3:3SiO_2:223\ H_2O$

The procedure was as in Example 1. Test (3a) is again intended for comparison. In tests (3b) and (3c), the sodium silicate solution was used in less than the stoichiometric quantity, based on the total stoichiometrically necessary quantity of silicate, the balance being added during the crystallization step. The crystalline zeolites obtained were then separated from the mother liquor by filtration, washed with demineralized water to pH 11 and dried at 110° C.

In all the tests, the following parameters were kept constant:

addition of the aluminate solution: 2 minutes precipitation temperature: 20° C.

forming time: 10 minutes heating time to the crystallization temperature: 20 minutes crystallization temperature: 80° C.

crystallization time: 24 hours, without stirring.

Table VII shows the quantity of silicate added during the crystallization step (over a period of 1 minute with intensive stirring) in percent, based on 100% of the stoichiometrically necessary total, and the addition time after the beginning of crystallization.

Table VIII shows the characteristic data of the zeolites of the NaX type obtained and the $SiO_2$ and $Al_2O_3$ contents (in % by weight) of the mother liquors.

TABLE VII

| Test No. | Quantity of silicate, replenished | Addition time |
|---|---|---|
| 3a* | 0% | 0 |
| 3b | 10% | 2 hours |
| 3c | 10% | 6 hours |

*Comparison Example

TABLE VIII

| Test No. | CaBC | $d_{50}$ [μm] | $d_{max}$ [μm] | Crystallinity | Mother liquors % $SiO_2$ | Mother liquors % $Al_2O_3$ |
|---|---|---|---|---|---|---|
| 3a* | 114 | 8.35 | 103 | High, NaX | 0.40 | 0.38 |
| 3b | 123 | 4.77 | 51 | High, NaX | 0.90 | 0.16 |
| 3c | 122 | 4.35 | 36 | High, NaX | 1.02 | 0.18 |

*Comparison Example

Example 4

Production of zeolites of the P type, silicate replenishment

Stoichiometric ratio of the components: 4.32 $Na_2O:Al_2O_3:2.3SiO_2:182\ H_2O$

The tests of this Example were carried out in the same way as in Example 3 above.

In all the tests, the following parameters were kept constant:

addition of the aluminate solution: 2 minutes precipitation temperature: 70° C.

forming time: 10 minutes heating time to the crystallization temperature: 10 minutes crystallization temperature: 90° C.

crystallization time: 6 hours, without stirring.

Tables IX and X correspond to Tables VII and VIII.

TABLE IX

| Test No. | Quantity of silicate, replenished | Addition time |
|---|---|---|
| 4a* | 0% | 0 |
| 4b | 10% | 1.5 hours |
| 4c | 10% | 5 hours |

*Comparison Example

TABLE X

| Test No. | CaBC | $d_{50}$ [μm] | $d_{max}$ [μm] | Crystallinity | Mother liquors % $SiO_2$ | Mother liquors % $Al_2O_3$ |
|---|---|---|---|---|---|---|
| 4a* | 120 | 2.00 | 12.5 | High, $P_c + P_t$ | 0.86 | 0.43 |
| 4b | 132 | 1.39 | 5 | High, $P_c + P_t$ | 1.25 | 0.23 |
| 4c | 137 | 1.73 | 5 | High, $P_c + P_t$ | 1.19 | 0.19 |

*Comparison Example

Example 5

Production of zeolite NaA, aluminate replenishment

Stoichiometric ratio of the components: 4.2 $Na_2O:Al_2O_3:2SiO_2:100\ H_2O$

The tests were carried out in the same way as in Example 1 except that, in Example 5, the aqueous sodium silicate solution was initially introduced in the stoichimetrically necessary quantity together with the aqueous sodium hydroxide. Instead, in Example 5—tests (5b) to (5p)—the aqueous sodium aluminate solution was only added in less than the stoichiometric quantity, based on the total stoichiometrically necessary quantity of aluminate, the balance being added during the crystallization step. Test (5a) is again intended for comparison, i.e. the total stoichiometrically necessary quantity of sodium aluminate was actually added during the precipitation step.

In all the tests, the following parameters were kept constant:

addition time for the first quantity of aluminate liquor in the precipitation step: 2 minutes (=mixing time), precipitation temperature: 60° C., forming time: 10 minutes, heating time to the crystallization temperature: 5 minutes, crystallization temperature: 85° C., crystallization time: 60 minutes, with stirring.

Table XI shows the particular quantity of aluminate added during the crystallization step in percent, based on 100% of the total stoichiometrically necessary quantity, and the replenishment time, based on the time at which the crystallization temperature was reached.

Table XII shows the characteristic data of the zeolites of the NaA type obtained in these tests. It can be seen that there is a reduction in the average particle size of the zeolites attributable to the replenishment of aluminate.

Table XIII shows the composition of the mother liquors obtained in the tests in regard to their $SiO_2$ and $Al_2O_3$ contents. It can be seen that the $SiO_2$ content of the mother liquors falls significantly by comparison with test (1a).

TABLE XI

| Test No. | Quantity of aluminate, replenished | Addition time |
|---|---|---|
| 5a* | 0% | 0 mins |
| 5b | 30% | 10% after 10, 20 and 30 mins. |
| 5c | 10% | 10 mins. |
| 5d | 10% | 15 mins. |
| 5e | 10% | 20 mins. |
| 5f | 10% | 23 mins. |
| 5g | 10% | 26 mins. |
| 5h | 10% | 30 mins. |
| 5i | 10% | 34 mins. |
| 5k | 20% | 20 mins. |
| 5l | 30% | 20 mins. |
| 5m | 15% | 20 mins. |
| 5n | 5% | 20 mins. |
| 5o | 5% | 27 mins. |
| 5p | 5% | 33 mins. |

*Comparison Example

TABLE XII

| Test No. | CaBC | $d_{50}$ [μm] | $d_{max}$ [μm] | Crystallinity |
|---|---|---|---|---|
| 5a* | 161 | 4.08 | 32.5 | High, NaA |
| 5b | 158 | 3.28 | 28.6 | High, NaA |
| 5c | 169 | 3.49 | 33.5 | High, NaA |
| 5d | 172 | 2.85 | 33.0 | High, NaA |
| 5e | 167 | 3.15 | 28.2 | High, NaA |
| 5f | 166 | 3.08 | 26.5 | High, NaA |
| 5g | 164 | 2.96 | 23.5 | High, NaA |
| 5h | 172 | 2.88 | 17.3 | High, NaA |
| 5i | 168 | 3.27 | 23.5 | High, NaA |
| 5k | 168 | 3.66 | 23.5 | High, NaA |
| 5l | 169 | 3.43 | 17.4 | High, NaA |
| 5m | 167 | 3.89 | 27.5 | High, NaA |
| 5n | 168 | 3.81 | 17.4 | High, NaA |
| 5o | 167 | 2.90 | 17.4 | High, NaA |
| 5p | 166 | 3.21 | 17.4 | High, NaA |

*Comparison Example

TABLE XIII

| Test No. | $SiO_2$ content [% by weight] | $Al_2O_3$ content [% by weight] |
|---|---|---|
| 5a* | 0.36 | 0.29 |
| 5b | 0.12 | 0.45 |
| 5c | 0.37 | 0.15 |
| 5d | 0.25 | 0.16 |
| 5e | 0.22 | 0.17 |
| 5f | 0.18 | 0.24 |
| 5g | 0.16 | 0.24 |
| 5h | 0.16 | 0.28 |
| 5i | 0.15 | 0.33 |
| 5k | 0.20 | 0.30 |
| 5l | 0.20 | 0.30 |
| 5m | 0.19 | 0.28 |
| 5n | 0.19 | 0.29 |
| 5o | 0.16 | 0.33 |
| 5p | 0.14 | 0.36 |

*Comparison Example

Example 6

Production of zeolite NaA, aluminate replenishment

As in Example 2, the tests of Example 6 show that the principle of aluminate replenishment during the crystallization step leads to positive effects even when the overall stoichiometric ratio of the components differs from that of Example 5. In the tests of Example 6, the sodium aluminate solution was used in more than the stoichiometric quantity, based on the total quantity of aluminate necessary according to the stoichiometric ratio of Example 5, during the crystallization step. In all the tests, the precipitation (mixing of the reaction components) was carried out in accordance with the stoichiometric ratio of Example 5, except that in this case the total quantity of aluminate required was actually introduced during the precipitation step. During the crystallization step, the sodium aluminate solution was used in more than the stoichiometric quantity, based on the total stoichiometrically necessary quantity of aluminate, so that the molar ratio of $Al_2O_3$ to $SiO_2$ at the end of crystallization was greater than 1:2.

All the other parameters were kept constant in accordance with Example 5.

Table XIV shows the excess quantity of aluminate added during the crystallization step in percent, based on 100% of the total stoichiometrically necessary quantity, and the addition time after the beginning of crystallization.

The disclosures of Tables XI and XVI—with regard to characteristic data and mother liquors—correspond to those of the Tables XII and XIII. It can be seen that, even where aluminate is replenished in excess, both the average particle size of the zeolites and the $SiO_2$ content of the mother liquors are reduced.

TABLE XIV

| Test No. | Quantity of aluminate excess, replenished | Addition time |
|---|---|---|
| 6a | 3% | 20 mins |
| 6b | 4% | 15 mins. |
| 6c | 4% | 20 mins. |
| 6d | 4% | 25 mins. |
| 6e | 4% | 30 mins. |
| 6f | 5% | 15 mins. |
| 6g | 5% | 20 mins. |
| 6h | 5% | 27 mins. |

TABLE XIV-continued

| Test No. | Quantity of aluminate excess, replenished | Addition time |
|---|---|---|
| 6i | 5% | 35 mins. |
| 6k | 6% | 20 mins. |
| 6l | 7% | 20 mins. |
| 6m | 8.5% | 20 mins. |
| 6n | 10% | 20 mins. |

TABLE XV

| Test No. | CaBC | $d_{50}$ [μm] | $d_{max}$ [μm] | Crystallinity |
|---|---|---|---|---|
| 6a | 168 | 3.39 | 17.4 | High, NaA |
| 6b | 171 | 3.04 | 17.4 | High, NaA |
| 6c | 168 | 3.01 | 17.4 | High, NaA |
| 6d | 171 | 2.96 | 17.4 | High, NaA |
| 6e | 169 | 2.96 | 17.4 | High, NaA |
| 6f | 168 | 2.97 | 17.4 | High, NaA |
| 6g | 169 | 3.72 | 20.6 | High, NaA |
| 6h | 171 | 2.78 | 17.4 | High, NaA |
| 6i | 168 | 2.71 | 17.4 | High, NaA |
| 6k | 167 | 3.21 | 17.4 | High, NaA |
| 6l | 169 | 2.61 | 17.4 | High, NaA |
| 6m | 172 | 2.99 | 17.4 | High, NaA |
| 6n | 181 | 2.77 | 17.4 | High, NaA |

TABLE XVI

| Test No. | $SiO_2$ content [% by weight] | $Al_2O_3$ content [% by weight] |
|---|---|---|
| 6a | 0.18 | 0.26 |
| 6b | 0.22 | 0.26 |
| 6c | 0.19 | 0.26 |
| 6d | 0.16 | 0.28 |
| 6e | 0.15 | 0.32 |
| 6f | 0.16 | 0.29 |
| 6g | 0.15 | 0.32 |
| 6h | 0.15 | 0.34 |
| 6i | 0.13 | 0.36 |
| 6k | 0.14 | 0.34 |
| 6l | 0.13 | 0.36 |
| 6m | 0.12 | 0.41 |
| 6n | 0.11 | 0.43 |

Example 7

Production of zeolite NaA (faujasite), aluminate replenishment

Stoichiometric ratio of the components: 4.56 $Na_2O:Al_2O_3:3$ $SiO_2$:223 $H_2O$ The tests were carried out as in Example 5. Test (7a) is intended for comparison. In tests (7b) and (7c), the sodium aluminate solution was again added in less than the stoichiometric quantity, based on the total stoichiometrically necessary quantity of aluminate, during the precipitation step, the balance being added during the crystallization step. The crystalline zeolites obtained were then separated from the mother liquor by filtration, washed with demineralized water to pH 11 and dried at 110° C.

In all the tests, the following parameters were kept constant:

addition time for the first quantity of aluminate liquor in the precipitation step: 2 minutes (=mixing time),
    precipitation temperature: 20° C.,
    forming time: 10 minutes,
    heating time to the crystallization temperature: 20 minutes,
    crystallization temperature: 80° C.,
    crystallization time: 24 hours, without stirring.

Table XVII shows the quantity of aluminate added during the crystallization step (over a period of 1 minute with intensive mixing) in percent, based on 100% of the total stoichiometrically necessary quantity, and also the addition time after the beginning of the crystallization step.

Table XVIII shows the characteristic data of the zeolites of the NaX type obtained and the $SiO_2$ and $Al_2O_3$ contents of the mother liquors (in % by weight).

TABLE XVII

| Test No. | Quantity of aluminate, replenished | Addition time |
|---|---|---|
| 7a* | 0% | 0 |
| 7b | 10% | 2 hours |
| 7c | 10% | 6 hours |

*Comparison Example

TABLE XVIII

| Test No. | CaBC | $d_{50}$ [μm] | $d_{max}$ [μm] | Crystallinity | Mother liquors % $SiO_2$ | % $Al_2O_3$ |
|---|---|---|---|---|---|---|
| 7a* | 114 | 8.35 | 103 | High, NaA | 1.02 | 0.18 |
| 7b | 123 | 5.52 | 51 | High, NaA | 0.62 | 0.23 |
| 7c | 121 | 5.23 | 36 | High, NaA | 0.15 | 0.15 |

*Comparison Example

Example 8

Production of zeolites of the P type, aluminate replenishment

Stoichiometric of the components: 4.32 $Na_2O:Al_2O_3$:2.3 $SiO_2$:182 $H_2O$

The tests of this Example were carried out as described in Example 7 above.

In all the tests, the following parameters were kept constant:

addition time for the first quantity of aluminate liquor in the precipitation step: 2 minutes,
    precipitation temperature: 70° C.,
    forming time: 10 minutes,
    heating time to the crystallization temperature: 10 minutes,
    crystallization temperature: 90° C.,
    crystallization time: 6 hours, without stirring.

Tables XIX and XX correspond to XVII and XVIII.

TABLE XIX

| Test No. | Quantity of aluminate, replenished | Addition time |
|---|---|---|
| 8a* | 0% | 0 |
| 8b | 10% | 1.5 hours |
| 8c | 10% | 5 hours |

*Comparison Example

TABLE XX

| Test No. | CaBC | $d_{50}$ [μm] | $d_{max}$ [μm] | Crystallinity | Mother liquors % $SiO_2$ | % $Al_2O_3$ |
|---|---|---|---|---|---|---|
| 8a* | 111 | 2.74 | 12.5 | High, Pc + Pt | 1.86 | 0.03 |
| 8b | 147 | 1.42 | 5 | High, Pc + Pt | 1.45 | 0.03 |
| 8c | 148 | 1.19 | 3.7 | High, Pc + Pt | 1.39 | 0.03 |

*Comparison Example

Comparison Example 9

Production of zeolite NaA in accordance with DE-A-30 07 123

Stoichiometric ratio of the components: 4.32 $Na_2O$:$Al_2O_3$ :2 $SiO_2$ :100 $H_2O$ 2 Liters of water were initially introduced. 2 l of sodium aluminate solution (188.5g/l $Na_2O$ and 85 g/l $Al_2O_3$) and 2.8 l of sodium silicate solution (104 g/l $Na_2O$ and 356 g/l $SiO_2$) were simultaneously added over a period of 10 minutes with vigorous stirring at a temperature of 60° C. The reaction mixture was then stirred for 30 minutes at the temperature of 62° C. spontaneously established. Another 8 l of sodium aluminate solution with the composition mentioned above were then introduced over a period of 2 hours at the same temperature, followed by the addition of another 1.1 l of sodium silicate solution with the composition shown above over a period of 10 minutes. The reaction mixture was then heated to 82° C. and stirred for 2 hours at that temperature. During the crystallization step, samples of the product obtained were removed at different times and characterized.

Table XXI shows the characteristic data of the products obtained as a function of the sampling times after reaching the crystallization temperature. It can be seen that crystallization only occurs at the elevated temperatures because only an amorphous product is present after the addition of the last quantity of the reaction component sodium silicate. For the formation of crystalline material, prolonged stirring of the reaction mixture is essential.

TABLE XXI

| Sample No. | Time [mins.] | CaBc [g CaO/g AS] | d (m) [μm] | Crystallinity (X-ray diffraction) |
|---|---|---|---|---|
| 9a | 0 | 42 | 28 | Amorphous |
| 9b | 30 | 44 | 27 | Amorphous |
| 9c | 60 | 68 | 22 | Slight |
| 9d | 120 | 162 | 8.2 | High |

We claim:

1. A process for the production of very fine-particle zeolitic alkali metal aluminum silicates corresponding to formula (I):

$$xMe_2O.Al_2O_3.y\ SiO_2.zH_2O \quad (I)$$

in which

Me is sodium and/or potassium, x is a number of 0.8 to 1.3, y is a number of 1.3 to 10, and z is a number of 0 to 6, comprising the steps of A) mixing together two reaction components, wherein the two reaction components are an aqueous solution of at least one sodium or potassium alkali metal silicate and an aqueous solution of at least one sodium or potassium alkali metal aluminate, in the presence of more than the stoichiometrically necessary quantity of an aqueous solution of at least one alkali metal hydroxide selected from the group consisting of sodium hydroxide and potassium hydroxide, wherein the mixing is carried out with intensive stirring over a period of less than 10 minutes at a temperature in the range of from about 20° to about 70° C. to form an amorphous alkali metal aluminum silicate gel and wherein at least one of the two reaction components is present in less than the stoiciometrically necessary quantity, or both reaction components are present in the stoichiometrically necessary quantity;

B) mixing the reaction mixture from step A) for from about 5 to about 40 minutes at a temperature in the range of from about 20° to about 70° C. to age the amorphous gel formed in step A);

C) heating the reaction mixture while mixing for from about 5 to about 30 minutes at a temperature of more than about 70° C. to the boiling point of the reaction mixture; and D) adding thereto from about 2 to about 50 mole % of at least one of the alkali metal aluminate and alkali metal silicate reaction components, based on the quantity of the reaction components used in step A), wherein the addition is in an amount sufficient to either make up the balance to the stoichiometrically necessary quantity thereof or as a stoichiometric excess, while maintaining the amorphous alkali metal aluminum silicate gel for at least about 10 minutes at a temperature in the range of more than about 70° C. to the boiling point of the reaction mixture to crystallize said gel; wherein the term "stoichiometrically necessary quantity" is based on the stoichiometry of the zeolitic alkali metal aluminum silicate of formula I; and wherein the compounds of formula I include zeolites of the A type, zeolites of the P type, and zeolites of the faujasite type.

2. The process of claim 1 wherein in formula I, y is a number in the range of from 1.35 to 2.35 for zeolites of the A type, a number in the range of from 1.85 to 3 for zeolites of the P type, and a number in the range of from 2.5 to 10 for zeolites of the faujasite type.

3. The process of claim 1 wherein the average particle size of the crystalline zeolite of formula I, expressed as the $d_{50}$ value, is less than 4 μm for zeolites of A type, less than 2 μm for zeolites of P type, and less than 6 μm for zeolites of the faujasite type.

4. The process of claim 1 wherein the alkali metal cation of the alkali metal silicate and/or the alkali metal aluminate is selected from sodium and potassium, with the proviso that at least 50 mole-% of the alkali metal cations in the zeolitic alkali metal aluminum silicate are sodium cations.

5. The process of claim 1 wherein in formula I, Me is sodium.

6. The process of claim 1 wherein in step A) the reaction components are mixed together over a period of less than about 5 minutes at a temperature in the range of from about 40° to about 65° C.

7. The process of claim 1 wherein in step B) the reaction mixture is mixed for from about 10 to about 30 minutes.

8. The process of claim 1 wherein step C) is carried for from about 5 to about 20 minutes.

9. The process of claim 1 wherein in step D) from about 5 to about 30 mole % of at least one of said reaction components is added to the reaction mixture.

10. The process of claim 1 wherein in step A) the at least one alkali metal silicate is present in the stoichiometrically necessary quantity, and the at least one alkali metal aluminate is present either in less than the stoichiometrically necessary quantity or in the stoichiometrically necessary quantity, and the at least one alkali metal aluminate is also added in step D).

11. The process of claim 1 wherein the silicate of formula I is a crystalline zeolite of the A type having an average particle size of less than 3 μm expressed as the $d_{50}$ value.

12. The process of claim 1 wherein step B) is carried out at the same temperature as step A).

13. The process of claim 12 wherein step D) is carried out at the same temperature as step C).

14. The process of claim 1 wherein step D) is carried out at the same temperature as step C).

15. The process of claim 11 wherein steps C) and D) are carried out at a temperature in the range of from about 80° to about 100° C.

16. The process of claim 15 wherein said temperature in steps C) and D) is from about 80 to about 90° C.

17. The process of claim 11 wherein step D) is stopped when the zeolitic silicate has reached its maximum calcium binding capacity.

18. The process of claim 11 wherein the addition in step D) is carried out over a period of from about 25 to about 75% of the total time used in step D).

* * * * *